United States Patent
Iwao

(10) Patent No.: US 10,430,960 B2
(45) Date of Patent: Oct. 1, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomoyori Iwao, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 43 days.

(21) Appl. No.: 15/714,301

(22) Filed: Sep. 25, 2017

(65) Prior Publication Data

US 2018/0089850 A1 Mar. 29, 2018

(30) Foreign Application Priority Data

Sep. 27, 2016 (JP) ................................. 2016-188407

(51) Int. Cl.
*G06T 7/00* (2017.01)
*G06T 7/593* (2017.01)
*G06T 5/00* (2006.01)
*G06T 15/20* (2011.01)
*G06T 17/00* (2006.01)
(Continued)

(52) U.S. Cl.
CPC .............. *G06T 7/593* (2017.01); *G06T 5/002* (2013.01); *G06T 7/44* (2017.01); *G06T 7/50* (2017.01); *G06T 15/205* (2013.01); *G06T 17/00* (2013.01); *G06T 2207/10028* (2013.01); *G06T 2207/30196* (2013.01); *G06T 2207/30201* (2013.01); *G06T 2210/16* (2013.01)

(58) Field of Classification Search
CPC ....... G06T 7/593; G06T 5/002; G06T 15/205; G06T 2207/10028; G06T 2207/30196; G06T 2210/16
See application file for complete search history.

(56) References Cited

U.S. PATENT DOCUMENTS

2010/0026717 A1* 2/2010 Sato ..................... A45D 44/005
345/642
2012/0075331 A1* 3/2012 Mallick ................. G06T 11/001
345/594
(Continued)

FOREIGN PATENT DOCUMENTS

JP 3832065 B2 10/2006

*Primary Examiner* — Ping Y Hsieh
(74) *Attorney, Agent, or Firm* — Canon U.S.A., Inc. IP Division

(57) ABSTRACT

An image processing apparatus includes a generation unit configured to generate first region data indicating a region corresponding to a general uneven shape of each of a plurality of bundles included in a three-dimensional object and second region data indicating a region corresponding to an uneven shape of an extremely small substance included in each of the bundles by analyzing image data, and an output unit configured to output shape data after correcting the shape data by adding the general uneven shape of each of the plurality of bundles included in the three-dimensional object to the general uneven shape of the three-dimensional object and adding the uneven shape of the extremely small substance included in each of the bundles on the general uneven shape of each of the plurality of bundles included in the three-dimensional object based on the first region data and the second region data.

20 Claims, 8 Drawing Sheets

(51) Int. Cl.
    *G06T 7/50*          (2017.01)
    *G06T 7/44*          (2017.01)

(56) References Cited

U.S. PATENT DOCUMENTS

2014/0064617 A1\*   3/2014   Kafuku .................. G06T 11/00
                                                               382/170
2015/0235305 A1\*   8/2015   Reed .................... G06F 17/5009
                                                               705/27.2

\* cited by examiner

IMAGE PROCESSING APPARATUS, IMAGE PROCESSING METHOD, AND STORAGE MEDIUM

BACKGROUND

Field of the Disclosure

The present disclosure relates to an image processing technique for reproducing an extremely small uneven shape on a surface of an object.

Description of the Related Art

In recent years, a technique for acquiring and reproducing a three-dimensional shape of a human head has been demanded for the purpose of use in, for example, fabrication of a bust with use of a three-dimensional (3D) printer and computer graphics (CG) reproduction of a cosmetic makeup. As a technique for acquiring data expressing a texture of head hair, Japanese Patent No. 3832065 discusses that a portion corresponding to the head hair can be extracted from an image and an undulation can be added to the extracted portion.

However, the technique discussed in Japanese Patent No. 3832065 replaces a head hair image expressing the portion corresponding to the head hair that is extracted from the image with a preregistered fine hair pattern, and therefore cannot reproduce a hair bundle flowing through a wide range. Further, reproduction of fine unevenness with high accuracy requires preparation of a large number of templates of hair patterns respectively having finely changed straight-line directions.

SUMMARY

The present disclosure is directed to providing image processing for reproducing a fibrous uneven shape existing on a surface of an object with high accuracy.

According to an aspect of the present disclosure, an image processing apparatus is configured to output data indicating a shape of a three-dimensional object including a plurality of bundles each including a plurality of extremely small substances. The image processing apparatus includes a first acquisition unit configured to acquire image data acquired by imaging the three-dimensional object, a second acquisition unit configured to acquire shape data indicating a general uneven shape of the three-dimensional object, a generation unit configured to generate first region data indicating a region corresponding to a general uneven shape of each of the plurality of bundles included in the three-dimensional object and second region data indicating a region corresponding to an uneven shape of the extremely small substance included in each of the bundles by analyzing the image data, and an output unit configured to output the shape data after correcting the shape data by adding the general uneven shape of each of the plurality of bundles included in the three-dimensional object to the general uneven shape of the three-dimensional object and adding the uneven shape of the extremely small substance included in each of the bundles on the general uneven shape of each of the plurality of bundles included in the three-dimensional object based on the first region data and the second region data.

Further features of the present disclosure will become apparent from the following description of exemplary embodiments with reference to the attached drawings.

DESCRIPTION OF THE EMBODIMENTS

Figure 1:
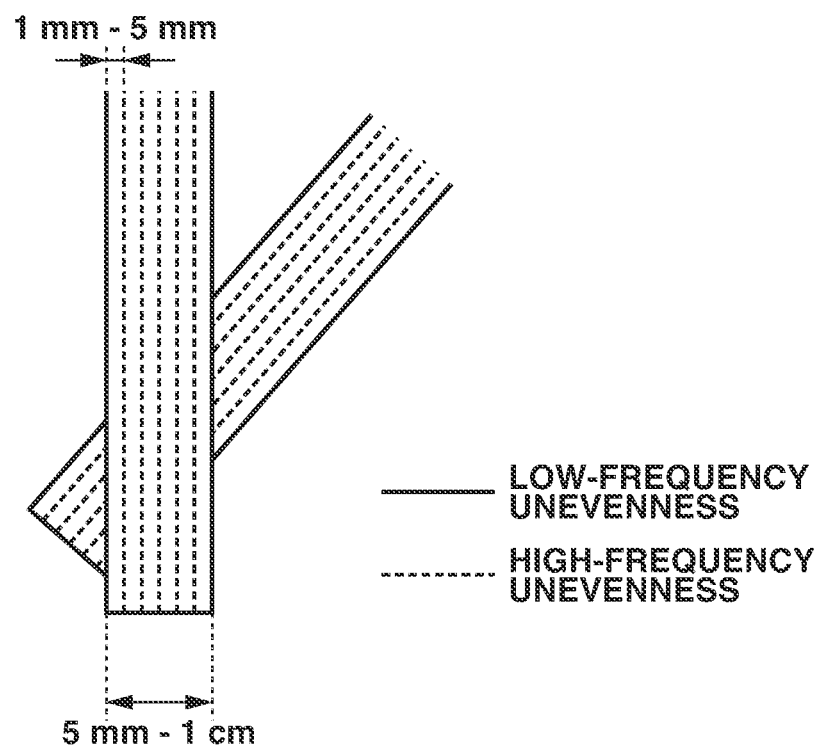
FIG. 1 is a schematic view of head hairs.

In the following description, an exemplary embodiment of the present disclosure will be described with reference to the drawings. However, the exemplary embodiment that will be described below is not intended to limit the present disclosure, and not all of combinations of features that will be described in the present exemplary embodiment are necessarily essential to a solution of the present disclosure. Similar configurations will be described while being identified by the same reference numeral.

In the following description, a first exemplary embodiment will be described. FIG. 1 is a schematic view of head hairs. As illustrated in FIG. 1, a shape of a hair can be regarded as including two types of unevenness, low-frequency unevenness (a hair bundle) and high-frequency unevenness (one hair to several hairs). In other words, head hair is a three-dimensional object including a plurality of bundles each including a plurality of extremely small substances (fibers). The present exemplary embodiment will be described based on the following example. A region corresponding to the head hair in an image is regarded as including the low-frequency unevenness and the high-frequency unevenness (unevenness having a higher frequency than the low-frequency unevenness), and their respective positions (regions) are identified. Then, an extremely small shape is added at a corresponding position (region) on three-dimensional shape data expressing a general shape of the head hair. The frequency of the unevenness is a frequency when the unevenness is deemed as a wave in which one dent and one bump forms one cycle.

Figure 2:
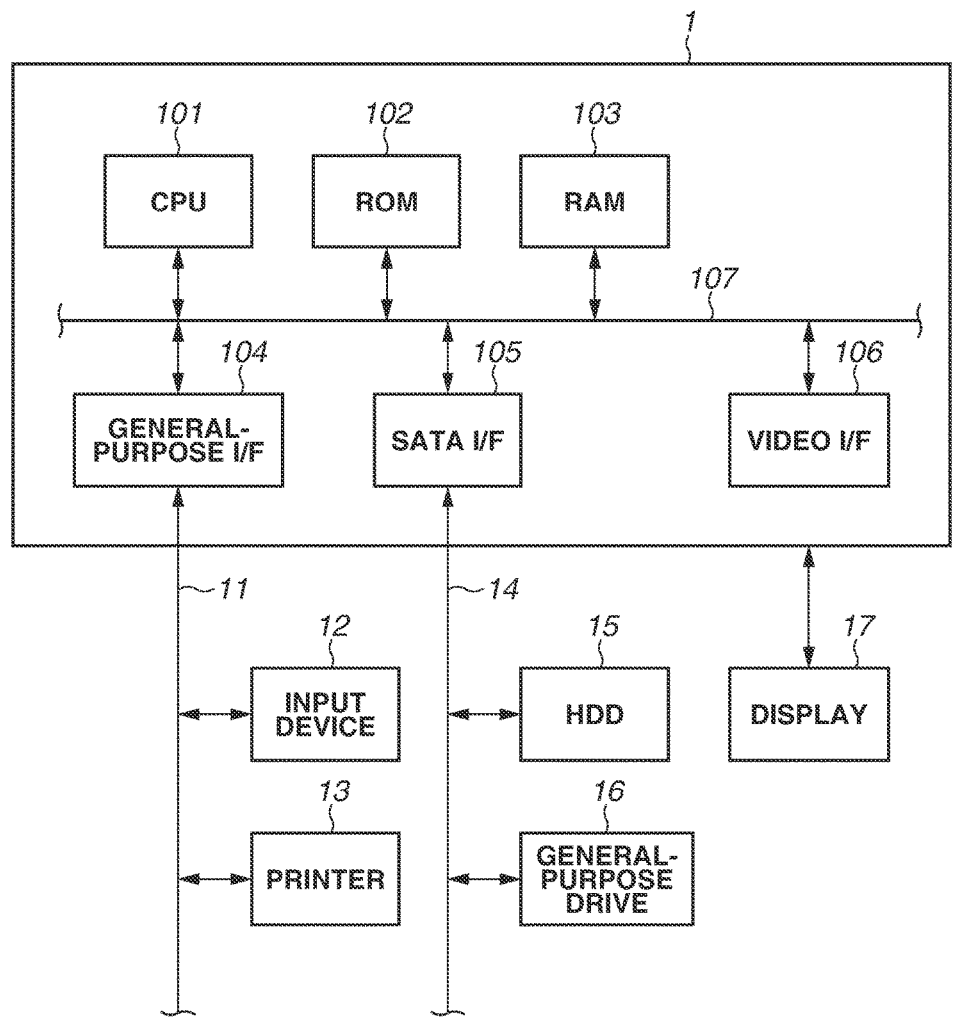
FIG. 2 is a block diagram illustrating an example of a hardware configuration of an image processing apparatus, according to one or more embodiments of the subject disclosure.

FIG. 2 illustrates an example of a hardware configuration of an image processing apparatus 1 according to the present exemplary embodiment. The image processing apparatus 1 is, for example, a computer, and includes a central processing unit (CPU) 101, a read only memory (ROM) 102, and a random access memory (RAM) 103. The CPU 101 executes an operating system (OS) and various kinds of programs stored in the ROM 102, a hard disk drive (HDD) 15, or the like with use of the RAM 103 as a work memory. Further, the CPU 101 controls each configuration via a system bus 107. Processing according to a flowchart that will be described below is performed by the CPU 101 while a program code stored in the ROM 102, the HDD 15, or the like is developed into the RAM 103. An input device 12, such as a mouse and a keyboard, and a printer 13 are connected to a general-purpose interface (I/F) 104 via a serial bus 11. The HDD 15 and a general-purpose drive 16, which reads and writes data from and into various kinds of recording media, are connected to a Serial Advanced Technology Attachment (SATA) I/F 105 via a serial bus 14. The CPU 101 uses the HDD 15 and the various kinds of recording media mounted on the general-purpose drive 16 as locations to store various kinds of data. A display 17 is connected to a video I/F 106. The CPU 101 displays a user interface (UI) provided by the program on the display 17, and receives an input such as a user instruction received via the input device 12.

Figure 4:
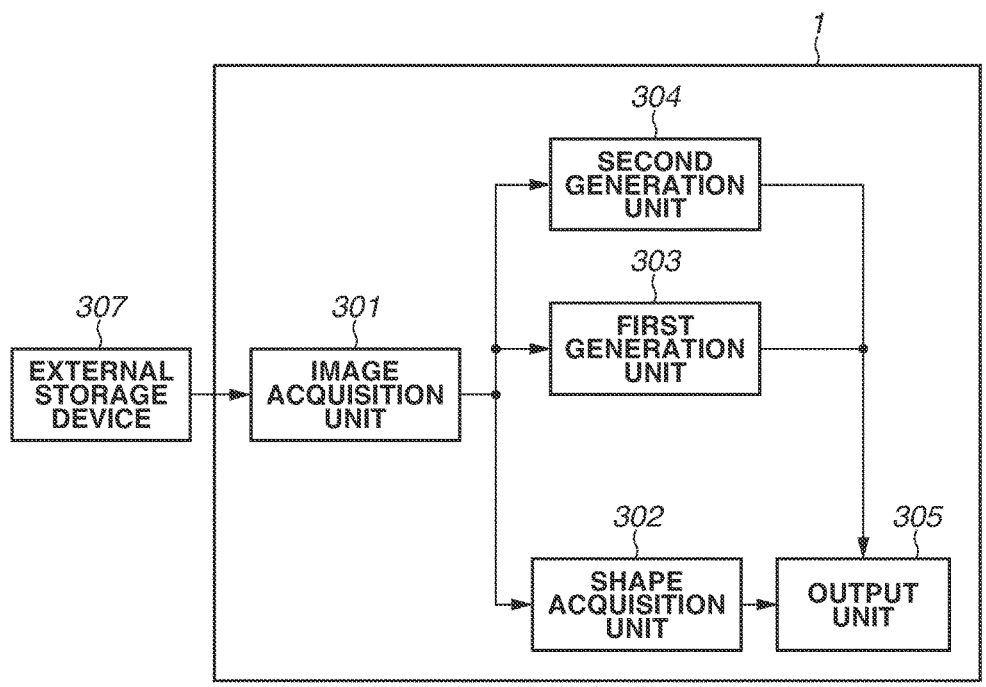
FIG. 4 is a block diagram illustrating an example of a logical configuration of the image processing apparatus, according to one or more embodiments of the subject disclosure.

FIG. 4 is a block diagram illustrating a functional configuration of the image processing apparatus 1 according to the present exemplary embodiment. The image processing apparatus 1 includes an image acquisition unit 301, a shape acquisition unit 302, a first generation unit 303, a second generation unit 304, and an output unit 305. The image acquisition unit 301 acquires a plurality of pieces of image data acquired by imaging a target object from multiple viewpoints. The shape acquisition unit 302 acquires the three-dimensional shape data indicating a three-dimensional shape (a general uneven shape) of the target object (a subject) from the plurality of pieces of image data. The first generation unit 303 identifies the position of the region corresponding to the low-frequency unevenness in the region corresponding to the head hair in the image indicated by the image data, and generates first region data indicating the low-frequency uneven region. Here, the low-frequency unevenness is a general uneven shape of each of the plurality of hair bundles included in the three-dimensional object. The second generation unit 304 identifies the position of the region corresponding to the high-frequency unevenness in the region corresponding to the head hair in the image indicated by the image data, and generates second region data indicating the high-frequency uneven region. Here, the high-frequency unevenness is an uneven shape of the extremely small substance (fiber) included in each of the hair bundles. The output unit 305 corrects the three-dimensional shape data by adding semi-cylindrical unevenness at the region in the three-dimensional shape data that corresponds to the region indicated by the first region data. Further, the output unit 305 corrects the three-dimensional shape data by adding semi-cylindrical unevenness at the region in the three-dimensional shape data that corresponds to the region indicated by the second region data. Then, the output unit 305 outputs the corrected three-dimensional shape data to an external device, such as the HDD 15.

Figure 5:
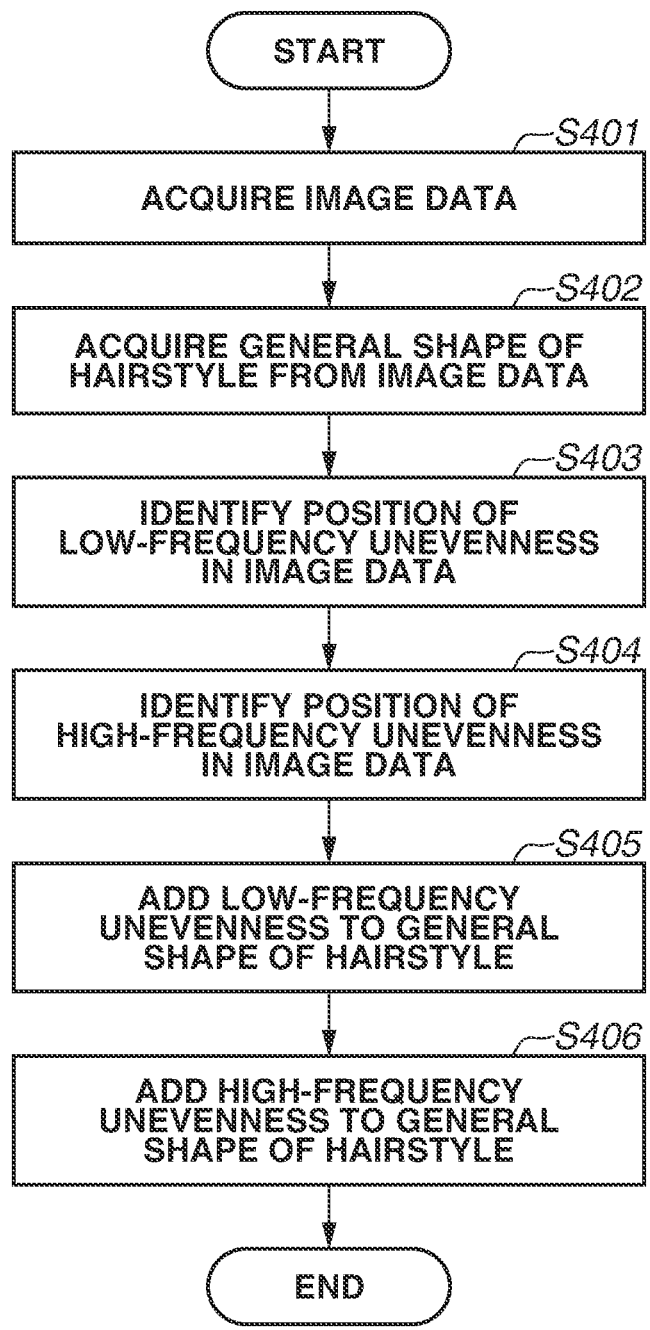
FIG. 5 is a flowchart illustrating a flow of processing performed by the image processing apparatus, according to one or more embodiments of the subject disclosure.

Next, the processing performed by the image processing apparatus 1 will be described with reference to a flowchart illustrated in FIG. 5. The CPU 101 executes the program stored in the ROM 102 with use of the RAM 103 as the work memory, by which the image processing apparatus 1 functions as each of the blocks illustrated in FIG. 4 and performs processing in each step illustrated in FIG. 5. The processing that will be described below does not have to be entirely performed by the CPU 101, and the image processing apparatus 1 may be configured in such a manner that a part or a whole of the processing is performed by one or a plurality of processing circuit(s) other than the CPU 101. In the following description, each step (process) is indicated with "S" added in front of a step number.

Figure 3:
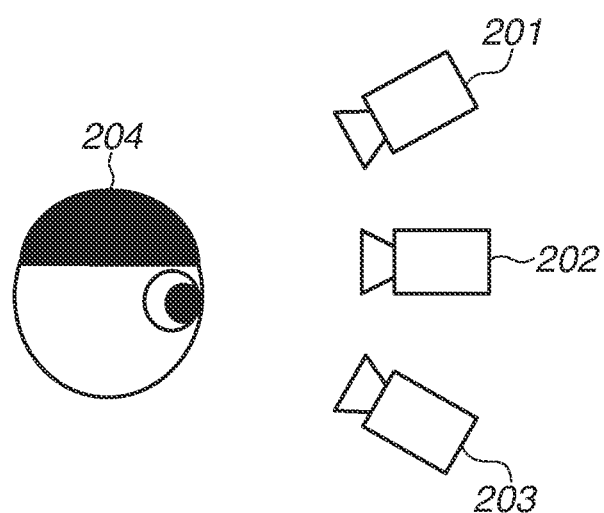
FIG. 3 illustrates an example of a method for imaging a target object from multiple viewpoints, according to one or more embodiments of the subject disclosure.

In step S401, the image acquisition unit 301 acquires the plurality of pieces of image data that is a processing target from an external storage device 307 such as the HDD 15, and outputs the acquired data to the shape acquisition unit 302, the first generation unit 303, and the second generation unit 304. The pieces of image data acquired here are an image group acquired by imaging a target object 204 from multiple viewpoints (a plurality of directions) with use of imaging devices 201 to 203 as illustrated in FIG. 3. The plurality of pieces of image data is output to the shape acquisition unit 302 to acquire a three-dimensional shape of the target object 204. One piece of image data acquired by imaging the target object 204 from a front thereof (image data acquired from the imaging by the imaging device 202), among the plurality of pieces of image data, is output to the first generation unit 303 and the second generation unit 304. The image processing apparatus 1 may be configured to select the one piece of image data to be output to the first generation unit 303 and the second generation unit 304 by receiving an instruction from the user.

In step S402, the shape acquisition unit 302 acquires the three-dimensional shape data indicating a three-dimensional shape (a general shape of a hairstyle) of the target object 204 based on the plurality of pieces of image data input from the image acquisition unit 301, and outputs the acquired three-dimensional shape data to the output unit 305. One example of a method for generating the three-dimensional shape from the image group acquired by the imaging from the multiple viewpoints is the known stereo matching. The stereo matching is a technique that acquires a three-dimensional shape of an object with use of a plurality of images captured from different viewpoints. In the present exemplary embodiment, the three-dimensional shape is acquired with use of this stereo matching. The method for acquiring the three-dimensional shape is not limited to the above-described stereo matching, and the shape acquisition unit 302 may directly acquire three-dimensional shape data acquired from, for example, measurement with use of a laser scanner or a depth sensor, or computer graphics (CG) rendering. Further, the shape acquisition unit 302 may acquire the three-dimensional shape data by generating the three-dimensional shape data in advance by the above-described method and storing the generated three-dimensional shape data into the external storage device 307 such as the HDD 15 without generating the three-dimensional shape data in the present step. Generally, the three-dimensional shape data generated with an attempt to acquire a detailed shape such as hairs contains a large amount of noise, and therefore should be subjected to noise reduction processing (smoothing processing). However, this noise reduction processing results in an undesirable loss of the detailed shape like hairs. On the other hand, the three-dimensional shape data generated with an attempt to acquire a rough shape does not contain the detailed shape like hairs. The three-dimensional shape data according to the present exemplary embodiment is data generated by the above-described method, and data indicating a general uneven shape that does not contain the low-frequency unevenness (the hair bundle) and the high-frequency unevenness (one hair to several hairs).

In step S403, the first generation unit 303 identifies the position of the low-frequency unevenness by analyzing the image data input from the image acquisition unit 301. In the present exemplary embodiment, the first generation unit 303 identifies the position of the low-frequency unevenness in the image data by detecting an edge (a change in a luminance) after applying a smoothing filter to the image data. To identify the position of the low-frequency unevenness, the first generation unit 303 first smooths the image to facilitate identification of a position of low-frequency unevenness that is approximately 5 mm to 1 cm in actual dimension. In the present exemplary embodiment, a Gaussian filter is applied to the image data as the processing for smoothing the image (reducing a resolution of the image). Assuming that I represents a luminance value in the image data, $\sigma_g$ represents a standard deviation, and 2w+1 is a filter size, an output luminance value $I_g$ when the Gaussian filter is applied to a pixel (u, v) is expressed by an equation (1).

$$I_g(u, v, w) = \frac{1}{2\pi\sigma_g^2} \sum_{n=-w}^{w} \sum_{m=-w}^{w} I(u+m, v+n)\exp\left(-\frac{m^2+n^2}{2\sigma_g^2}\right) \quad (1)$$

In this equation (1), the standard deviation $\sigma_g$ corresponds to a cycle of the low-frequency unevenness. If the data acquired by the image acquisition unit 301 is image data indicating a color signal (Red-Green-Blue (RGB) value), the data is converted into grayscale image data indicating the luminance with use of a known conversion equation in advance before the Gaussian filter is applied thereto. The acquisition of the grayscale image data may be achieved by preparing the grayscale image data in the external storage device 307 in advance, and acquiring it by the image acquisition unit 301.

A moving average filter, a medial filter, or other filter may be used instead of the above-described Gaussian filter. An output luminance value $I_A$ in the case where the moving average filter is used is expressed by an equation (2).

$$I_A(u, v, w') = \frac{1}{(2W'+1)^2} \sum_{n=-w}^{w} \sum_{m=-w}^{w} I(u+m, v+n) \quad (2)$$

Further, the medial filter is a filter that re-sorts luminance values of a pixel of interest and a region around it in descending order, and outputs a median value when the luminance values are re-sorted.

Next, the first generation unit 303 convolves an unsharp mask on the image data with the Gaussian filter applied thereto to identify the position of the low-frequency unevenness. The unsharp mask is one of filters for emphasizing a color difference between pixels. A luminance value I' of the output image when the unsharp mask is convolved is expressed by an equation (3), assuming that 2w'+1 is a filter size and k represents a sharpening constant. Normally, the filter size of the unsharp mask approximately matches the filter size of the Gaussian filter.

$$I'(u,v,w')=I(u,v)+k(I(u,v)-I_g(u,v,w')) \quad (3)$$

The edge may be detected (the position of the unevenness may be identified) with use of a Gabor filter instead of the unsharp mask.

Lastly, the first generation unit 303 performs binarization processing by an equation (4) on the image data with the unsharp mask convolved thereon, assuming that t represents a threshold value regarding the luminance. By this operation, the first generation unit 303 generates the first region data (binary data) indicating the position of the low-frequency uneven region (a position corresponding to I"=1)

$$I''(u, v) = \begin{cases} 1 & \text{for } I'(u, v) \geq t \\ 0 & \text{for } I'(u, v) < t \end{cases} \quad (4)$$

In step S404, the second generation unit 304 identifies the position of the high-frequency unevenness (a cycle: approximately 1 mm to 5 mm) by analyzing the image data output from the image acquisition unit 301. In the present exemplary embodiment, the second generation unit 304 identifies the position of the high-frequency unevenness in the image data by detecting the edge without applying the smoothing filter to the image data. The second generation unit 304 performs the binarization processing similarly to the first generation unit 303 after directly convolving the unsharp mask on the image data, to identify the position of the high-frequency unevenness. The second generation unit 304 generates the second region data (binary data) indicating the position of the high-frequency uneven region based on a result of the identification.

Figure 8A:
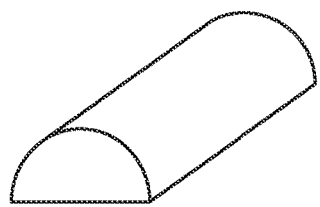
FIGS. 8A, 8B, and 8C each illustrate an example of an uneven shape, according to one or more embodiments of the subject disclosure.
Figure 8B:
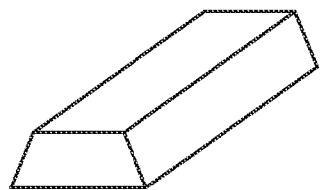
Figure 8C:
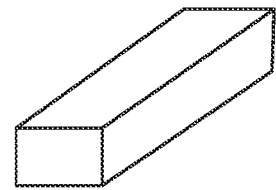

In step S405, the output unit 305 adds the low-frequency unevenness at the position on the three-dimensional shape data that corresponds to the position of the low-frequency unevenness, which is identified by the first generation unit 303, based on the first region data. In the present exemplary embodiment, a shape of the added predetermined unevenness is assumed to be a semi-cylindrical shape, like an example illustrated in FIG. 8A. The shape of the unevenness is not limited to the cylindrical shape, and may be a rod-like shape trapezoidal or rectangular in cross section, like examples illustrated in FIGS. 8B and 8C. A method for correcting the three-dimensional shape data to add the low-frequency unevenness will be described below.

In step S406, the output unit 305 adds the high-frequency unevenness at the position on the three-dimensional shape data that corresponds to the position of the high-frequency unevenness, which is identified by the second generation unit 304. A shape of the added predetermined unevenness is assumed to be a semi-cylindrical shape but may be a rod-like shape trapezoidal or rectangular in cross section, similarly to step S405. Then, the cycle of the high-frequency unevenness added in step S406 is shorter than the cycle of the low-frequency unevenness. A method for correcting the three-dimensional shape data to add the high-frequency unevenness will be described below.

In the following description, the processing for correcting the three-dimensional shape data to add the low-frequency unevenness (step S405) will be described. In the present exemplary embodiment, assume that the three-dimensional shape data indicating the general shape of the hairstyle, which is acquired from the stereo matching, is depth data. The depth data is data indicating a distance (a depth) from the subject to the imaging apparatus. The three-dimensional shape data is not limited to the depth data, and may be mesh data, point group data, or other data. Alternatively, the three-dimensional shape data may be data indicating a height from a surface of the image.

First, a normal vector n (n, v) for each pixel is calculated by an equation (5) with respect to the depth data having a depth d (u, v) at each pixel.

$$n(u,v)=\nabla d(u,v) \quad (5)$$

In this equation (5), $\nabla$ represents a gradient. Next, a normal vector corresponding to a pixel having a pixel value of 1 in the binary data acquired in step S403 is converted. The pixel having the pixel value of 1 is searched for horizontally row by row from an upper left pixel to a lower right pixel in the binary data I″. Then, based on the normal vector (u, v) of a pixel located at a center in a group of horizontally connected pixels having the pixel value of 1, the normal vector corresponding to each of the pixels in the pixel group is converted. At this time, the normal vector is converted by an equation (6), assuming that c represents the number of connected pixels, (u′, v′) represents the central pixel, and Re represents a three-dimensional rotation matrix for a rotation by θ around a y axis.

$$n'(u, v') = R_{\frac{\pi(u-u')}{c}} n(u', v') \quad (6)$$

Regarding the pixel for which the normal vector is converted, the depth is calculated from the normal vector by an equation (7), and the value of the depth is replaced therewith.

$$d(u, v) = \sum_{m=0}^{u-1} \frac{n'_x(m, v)}{n'_z(m, v)} + \sum_{n=0}^{v-1} \frac{n'_x(u, n)}{n'_z(u, n)} \quad (7)$$

The depth of the region at which the unevenness is added is corrected in this manner, by which the low-frequency unevenness is reproduced on the three-dimensional shape data.

Next, the processing for correcting the three-dimensional shape data to add the high-frequency unevenness (step S406) will be described. Because the high-frequency unevenness is added on the low-frequency unevenness in a superimposed manner, the second region data indicating the high-frequency uneven region is corrected with use of the first region data indicating the low-frequency uneven region before the high-frequency unevenness is added. Regarding the correction, 0 is set to a pixel value of a pixel in the second region data indicating the high-frequency uneven region that corresponds to a pixel having a pixel value of 0 in the first region data indicating the low-frequency uneven region. This setting prevents the high-frequency unevenness from being added at a position where the low-frequency unevenness is not added. After the correction of the second region data, the normal vector is calculated by the equation (5), and then a normal vector corresponding to the position of the high-frequency unevenness is converted by the equation (6), similarly to step S405. Then, the depth of the pixel for which the normal vector is converted is calculated from the equation (7) and the value of the depth is replaced therewith.

Figure 6:
FIG. 6 illustrates an example of a processing result, according to one or more embodiments of the subject disclosure.
Figure 7:
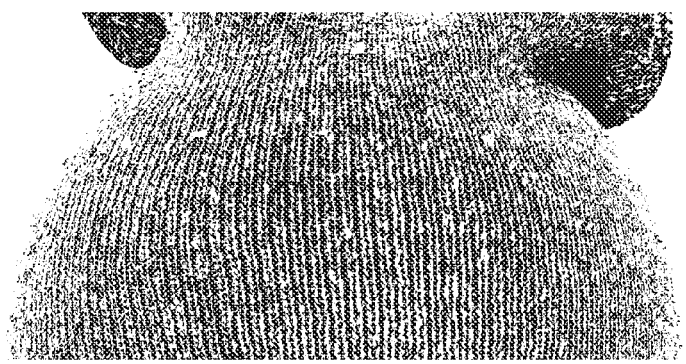
FIG. 7 illustrates an example of the processing result, according to one or more embodiments of the subject disclosure.

In this manner, the image processing apparatus 1 according to the present exemplary embodiment detects the edge in the image data with the smoothing filter applied thereto and the image data without the smoothing filter applied thereto, and identifies the position of the low-frequency unevenness and the position of the high-frequency unevenness. Then, the image processing apparatus 1 according to the present exemplary embodiment reproduces the extremely small unevenness of the head hair by correcting the depth of the position indicated by the three-dimensional shape data that corresponds to each of the identified positions. FIG. 6 illustrates a shape acquired by imaging a wig (the head hair) as the object having the fibrous unevenness on the surface thereof and reproducing this wig from the imaged data, to make an effect from the present exemplary embodiment easily understandable. It can be confirmed from FIG. 6 that both the low-frequency shape and the high-frequency shape are able to be reproduced. Further, this processing can also be applied to a cloth having a fine fibrous structure. FIG. 7 illustrates a shape acquired from a photographed knit cap. It can be confirmed from FIG. 7 that both the low-frequency shape and the high-frequency shape are also able to be reproduced with respect to the knit cap similarly to hair. In this manner, according to the present exemplary embodiment, a shape of a subject having a similar microstructure to hair can also be reproduced.

[Exemplary Modification]

In the above-described exemplary embodiment, the extremely small uneven shape of the head hair is reproduced on the three-dimensional shape data, but the uneven shape may also be reproduced by controlling a height of a surface of an image indicated by two-dimensional image data. In this case, the image acquisition unit 301 acquires one piece of image data. The image acquisition unit 301 outputs the image data to the first generation unit 303 and the second generation unit 304. The shape acquisition unit 302 acquires two-dimensional image data having a height or a depth from a reference surface at each pixel from the external storage device 307. Then, the height or the depth at the pixel corresponding to each of the positions identified by the first generation unit 303 and the second generation unit 304 is corrected. The extremely small uneven shape of the head hair can be reproduced on the two-dimensional image data by the above-described processing.

In the above-described exemplary embodiment, the extremely small uneven shape of the head hair is reproduced on the three-dimensional shape data, but the extremely small uneven shape of the head hair may be reproduced through a printed product by outputting the three-dimensional shape data (or the two-dimensional image data) to a printer. In this case, a 3D printer or a printer capable of forming unevenness on a surface of a recording medium can be used as the printer to which the data is output.

In the above-described exemplary embodiment, the unevenness is added to the three-dimensional shape data with use of the region data identifying the uneven region without any correction made thereto. However, the region data indicating the identified uneven region may contain noise, and therefore the unevenness may be added after this noise is reduced. In this case, the noise is reduced before the normal vector is converted by the equation (6). One example of a method for reducing the noise is a method using the number of connected pixels around the pixel of interest. If a threshold value t′ is set with respect to the number of connected pixels adjacent to the pixel of interest, the binarization processing is provided as indicated by an equation (8). The equation (8) is an equation prepared to perform processing that, if the number of connected pixels is smaller than the threshold value t′, regards this pixel value as noise.

$$I_t(u, v) = \begin{cases} 1 & \text{for } \sum_{n=-1}^{1} \sum_{m=-1}^{1} I(u+m, v+n) \geq t' \\ 0 & \text{for } \sum_{n=-1}^{1} \sum_{m=-1}^{1} I(u+m, v+n) < t' \end{cases} \quad (8)$$

The noise reduction is not limited to the above-described one example, and the noise may be reduced with use of a median filter.

In the above-described exemplary embodiment, the normal vector is converted with use of the equation (6), but the conversion of the normal vector is not limited to the above-described one example. The normal vector may be converted so as to reduce the number of connected pixels corresponding to a width of the unevenness (so as to make a cross-sectional diameter of the added unevenness narrower than that of the identified position) to add further sharp unevenness. Assuming that r represents the number of pixels by which the number of connected pixels is reduced, the conversion of the normal vector is provided as indicated by an equation (9).

$$n'(u', v') = R_{\frac{\pi(u-u')}{2c-r}} n(u', v') \qquad (9)$$

In the above-described exemplary embodiment, the shape data is corrected by adding the unevenness having the predetermined certain shape at the corresponding region in the shape data, but the present exemplary embodiment is not limited thereto. For example, the present exemplary embodiment may be configured in the following manner. A size of the general uneven shape of each of the plurality of bundles included in the three-dimensional object (the low-frequency unevenness) and a size of the uneven shape of the extremely small substance included in each of the bundles (the high-frequency unevenness) are identified based on the acquired image data. Then, the above-described shape data is corrected by adding an uneven shape of a size according to each of the identified sizes to the general uneven shape of the above-described three-dimensional object.

In the above-described exemplary embodiment, the pixels to be connected are searched for horizontally in the binary data, but may be searched for vertically.

According to the present disclosure, the fibrous uneven shape existing on the surface of the object can be reproduced with high accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-188407, filed Sep. 27, 2016, which is hereby incorporated by reference herein in its entirety.

What is claimed is:

1. An image processing apparatus configured to output data indicating a shape of a three-dimensional object including a plurality of bundles each including a plurality of fibers, the image processing apparatus comprising:
   one or more processors; and
   one or more memories storing instructions, when executed by the one or more processors, causing the image processing apparatus to function as:
   a first acquisition unit configured to acquire image data acquired by imaging the three-dimensional object;
   a second acquisition unit configured to acquire shape data indicating a general uneven shape of the three-dimensional object;
   a generation unit configured to generate first region data indicating a region corresponding to a general uneven shape of each of the plurality of bundles included in the three-dimensional object and second region data indicating a region corresponding to an uneven shape of the fibers included in each of the bundles by analyzing the image data; and
   an output unit configured to output the shape data after correcting the shape data by adding the general uneven shape of each of the plurality of bundles included in the three-dimensional object to the general uneven shape of the three-dimensional object and adding the uneven shape of the fibers included in each of the bundles on the general uneven shape of each of the plurality of bundles included in the three-dimensional object based on the first region data and the second region data.

2. The image processing apparatus according to claim 1, wherein the first acquisition unit acquires a plurality of pieces of image data acquired by imaging the three-dimensional object from a plurality of directions, and wherein the second acquisition unit generates and acquires the shape data based on the plurality of pieces of image data.

3. The image processing apparatus according to claim 1, wherein the shape data is data acquired from measurement with use of a laser scanner or a depth sensor, or from CG rendering.

4. The image processing apparatus according to claim 1, wherein the shape data is two-dimensional image data indicating a height or a depth of the three-dimensional object from a reference surface as the general uneven shape of the three-dimensional object.

5. The image processing apparatus according to claim 1, wherein the generation unit identifies the region corresponding to the general uneven shape of each of the plurality of bundles included in the three-dimensional object by detecting a change in a luminance in the image data after smoothing the image data, and identifies the region corresponding to the uneven shape of the fibers included in each of the bundles by detecting the change in the luminance in the image data without smoothing the image data.

6. The image processing apparatus according to claim 5, wherein the generation unit identifies the region corresponding to the general uneven shape of each of the plurality of bundles included in the three-dimensional object after smoothing the image data with use of a Gaussian filter.

7. The image processing apparatus according to claim 5, wherein the generation unit identifies the region corresponding to the general uneven shape of each of the plurality of bundles included in the three-dimensional object after smoothing the image data with use of a moving average filter or a median filter.

8. The image processing apparatus according to claim 5, wherein the generation unit detects the change in the luminance with use of an unsharp mask.

9. The image processing apparatus according to claim 5, wherein the generation unit detects the change in the luminance with use of a Gabor filter.

10. The image processing apparatus according to claim 1, wherein the shape data is data indicating a depth,
wherein the image processing apparatus further comprises
a calculation unit configured to calculate a normal vector on a surface of the three-dimensional object that corresponds to the depth indicated by the shape data, and
a conversion unit configured to convert the normal vector in such a manner that a predetermined shape is acquired as a shape of a region in the shape data that corresponds to each of the region corresponding to the general uneven shape of each of the plurality of bundles included in the three-dimensional object, which is indicated by the first region data, and the region corresponding to the uneven shape of the fibers included in each of the bundles, which is indicated by the second region data, and
wherein the output unit corrects the shape data by calculating a depth from the normal vector converted by the conversion unit and replacing the depth indicated by the shape data with the calculated depth.

11. The image processing apparatus according to claim 10, wherein the predetermined shape is a semi-cylindrical shape.

12. The image processing apparatus according to claim 10, wherein the predetermined shape is a rod-like shape trapezoidal or rectangular in cross section.

13. The image processing apparatus according to claim 10, wherein the conversion unit converts the normal vector so as to make a diameter of a cross section of the predetermined shape narrower than the region in the shape data that corresponds to each of the region corresponding to the general uneven shape of each of the plurality of bundles included in the three-dimensional object, which is indicated by the first region data, and the region corresponding to the uneven shape of the fibers included in each of the bundles, which is indicated by the second region data.

14. The image processing apparatus according to claim 1, wherein the output unit corrects the shape data by adding an uneven shape having a size according to each of a size of the general uneven shape of each of the plurality of bundles included in the three-dimensional object and a size of the uneven shape of the fibers included in each of the bundles, which are identified based on the image data, to the general uneven shape of the three-dimensional object.

15. The image processing apparatus according to claim 1, wherein the three-dimensional object is head hair.

16. The image processing apparatus according to claim 1, wherein the three-dimensional object is a cloth.

17. The image processing apparatus according to claim 1, wherein the general uneven shape of each of the plurality of bundles included in the three-dimensional object includes unevenness having a cycle of 5 mm to 1 cm, and the uneven shape of the fibers included in each of the bundles includes unevenness having a cycle of 1 mm to 5 mm.

18. The image processing apparatus according to claim 1, further comprising a reduction unit configured to reduce noise contained in the first region data and the second region data,
wherein the output unit corrects the shape data based on the first region data and the second region data with the noise reduced by the reduction unit therein.

19. An image processing method for outputting data indicating a shape of a three-dimensional object including a plurality of bundles each including a plurality of fibers, the image processing method comprising:
acquiring image data acquired by imaging the three-dimensional object, as first acquisition;
acquiring shape data indicating a general uneven shape of the three-dimensional object, as second acquisition;
generating first region data indicating a region corresponding to a general uneven shape of each of the plurality of bundles included in the three-dimensional object and second region data indicating a region corresponding to an uneven shape of the fibers included in each of the bundles by analyzing the image data; and
outputting the shape data after correcting the shape data by adding the general uneven shape of each of the plurality of bundles included in the three-dimensional object to the general uneven shape of the three-dimensional object and adding the uneven shape of the fibers included in each of the bundles on the general uneven shape of each of the plurality of bundles included in the three-dimensional object based on the first region data and the second region data.

20. A non-transitory computer-readable storage medium storing instructions that, when executed by a computer, cause the computer to perform a method comprising:
acquiring image data acquired by imaging a three-dimensional object including a plurality of bundles each including a plurality of fibers, as first acquisition;
acquiring shape data indicating a general uneven shape of the three-dimensional object, as second acquisition;
generating first region data indicating a region corresponding to a general uneven shape of each of the plurality of bundles included in the three-dimensional object and second region data indicating a region corresponding to an uneven shape of the fibers included in each of the bundles by analyzing the image data; and
outputting the shape data after correcting the shape data by adding the general uneven shape of each of the plurality of bundles included in the three-dimensional object to the general uneven shape of the three-dimensional object and adding the uneven shape of the fibers included in each of the bundles on the general uneven shape of each of the plurality of bundles included in the three-dimensional object based on the first region data and the second region data.

* * * * *